United States Patent
Platt et al.

(10) Patent No.: US 8,681,979 B2
(45) Date of Patent: *Mar. 25, 2014

(54) CONDITIONAL ACCESS SYSTEM AND METHOD FOR PREVENTION OF REPLAY ATTACKS

(75) Inventors: David C. Platt, Mountain View, CA (US); Andrew M. Goodman, Portola Valley, CA (US); Daniel Zenchelsky, Los Gatos, CA (US)

(73) Assignee: TiVo Inc., Alviso, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/253,909

(22) Filed: Oct. 5, 2011

(65) Prior Publication Data

US 2012/0027208 A1 Feb. 2, 2012

Related U.S. Application Data

(60) Continuation of application No. 12/553,027, filed on Sep. 2, 2009, now Pat. No. 8,036,382, which is a division of application No. 10/220,356, filed as application No. PCT/US01/06911 on Mar. 2, 2001, now Pat. No. 7,590,240.

(60) Provisional application No. 60/186,551, filed on Mar. 2, 2000.

(51) Int. Cl.
H04N 7/167 (2011.01)
(52) U.S. Cl.
USPC .......................................................... 380/210
(58) Field of Classification Search
None
See application file for complete search history.

(56) References Cited

U.S. PATENT DOCUMENTS

| 5,796,828 A | 8/1998 | Tsukamoto et al. |
| 5,862,299 A | 1/1999 | Lee et al. |
| 5,937,066 A | 8/1999 | Gennaro et al. |

(Continued)

FOREIGN PATENT DOCUMENTS

| EP | 864 959 | 9/1998 |
| GB | 2 375 923 A | 11/2002 |

(Continued)

OTHER PUBLICATIONS

Claims, PCT/US2005/042192, dated Dec. 28, 2006, 12 pages.

(Continued)

*Primary Examiner* — Brandon Hoffman
(74) *Attorney, Agent, or Firm* — Hickman Palermo Truong Becker Bingham Wong LLP; Kirk D. Wong

(57) ABSTRACT

In a conditional access system, a headend transmits content to one or more receivers in encrypted transport streams. The system provides a multi-layer security architecture, rendering the system resistant to key replay attacks; if one layer is circumvented, subsequent layers remain intact. A first layer prevents unencrypted keys from being recorded by shielding the unencrypted keys from users and encrypting the path from the receiver's conditional access module to the transport decryption module; a second layer prevents a key recorded on one receiver from being played back to the transport decryption module on a second receiver; a third layer prevents a user from decrypting transport streams without the encryption module by encrypting the stream a second time prior to being passed through any user-accessible memory or processor. Event tables are transmitted with the transport stream, either unencrypted for immediate use or encrypted, to prevent unauthorized use.

18 Claims, 1 Drawing Sheet

(56) References Cited

U.S. PATENT DOCUMENTS

| | | |
|---|---|---|
| 5,991,400 A | 11/1999 | Kamperman |
| 6,170,005 B1 * | 1/2001 | Meandzija .................. 709/217 |
| 6,209,097 B1 * | 3/2001 | Nakayama et al. ........... 713/193 |
| 7,239,704 B1 | 7/2007 | Maillard et al. |
| 2003/0118014 A1 | 6/2003 | Iyer et al. |
| 2004/0003079 A1 | 1/2004 | Aiu et al. |
| 2004/0117483 A1 | 6/2004 | Singer et al. |

FOREIGN PATENT DOCUMENTS

| | | |
|---|---|---|
| WO | WO 99/07145 | 2/1999 |
| WO | WO 01/53963 A1 | 7/2001 |
| WO | WO 2003/043326 A1 | 5/2003 |
| WO | WO 2005/060659 A2 | 7/2005 |

OTHER PUBLICATIONS

International Preliminary Examining Authority, "Notification of Transmittal of The International Preliminary Report on Patentability", PCT/US2005/042192, dated May 11, 2007, 15 pages.

Iannella, Renato, "Open Digital Rights Language (ODRL)", XP-002333742, IPR Systems, Version 0.9, dated Jun. 29, 2001, 46 pages.

* cited by examiner

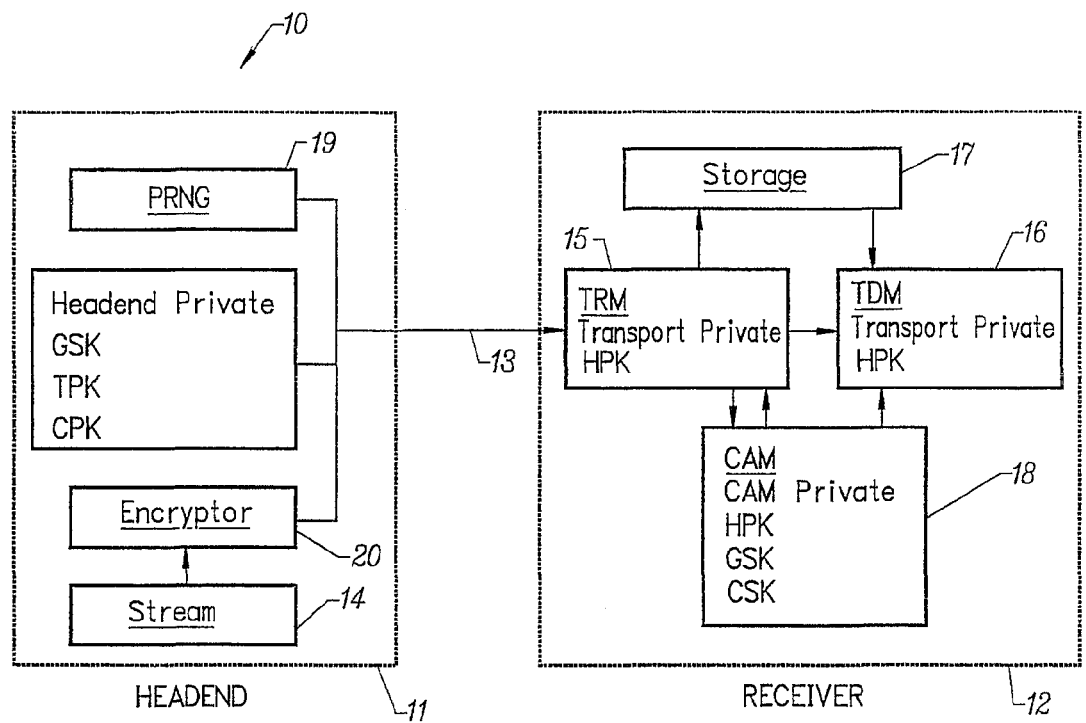

CONDITIONAL ACCESS SYSTEM AND METHOD FOR PREVENTION OF REPLAY ATTACKS

CROSS REFERENCE TO RELATED APPLICATIONS

This application is a continuation application of U.S. application Ser. No. 12/553,027 filed on Sep. 2, 2009 (now U.S. Pat. No. 8,036,382, issued on Oct. 11, 2011), which is a divisional of U.S. application Ser. No. 10/220,356, filed Dec. 11, 2002 (now U.S. Pat. No. 7,590,240, issued on Sep. 15, 2009), which is a national phase application of PCT Application No. PCT/US01/06911, filed Mar. 2, 2001, which claims benefit of priority to U.S. Provisional Application Ser. No. 60/186,551, filed Mar. 2, 2000, the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s). The applicant(s) hereby rescind any disclaimer of claim scope in the parent application(s) or the prosecution history thereof and advise the USPTO that the claims in this application may be broader than any claim in the parent application(s).

BACKGROUND OF THE INVENTION

1. Technical Field

The invention relates to security in conditional access systems. More particularly the invention relates to a conditional access system that includes a multi-layer cryptographic security architecture for prevention of replay attacks.

2. Technical Background

In conditional access systems, such as cable television networks, audio, video, data and other forms of content in electronic form may be broadcast as digital transport streams. The transport stream originates at the system headend and is transmitted to and received by receiver units that display or make use of the transport stream. In order to prevent unauthorized use or viewing of the transport stream, the stream may be encrypted. In such systems, the receiver is capable of decrypting the transport stream prior to viewing or using it.

Typically, the algorithm used to encrypt the transport stream is controlled by an encryption key. When decrypting the transport stream at the receiver end, the receiver must have the key. As a security measure, the key is periodically changed. Because the key is changed on a regular basis, there can be multiple keys required to decrypt the transport stream. The keys are then encrypted and broadcast within the transport stream.

Generally, within the receiver unit of a conditional access system, a Transport Reception Module (TRM) is operative to receive the transport stream transmitted from the headend. Furthermore, a Conditional Access Module (CAM) decides whether or not to decrypt the stream, based on services purchased by the user. If the CAM allows the user to view or otherwise use the transport stream, it decrypts the keys and provides them to the Transport Decryption Module (TDM) for use in decrypting the transport stream. Thus, the TDM is operative to decrypt the transport stream, using the decrypted keys supplied by the CAM. Following decryption, the decrypted stream is displayed to the user on a display module.

Often, encrypted transport streams are recorded by the receiver and stored for future use. Furthermore, current conditional access systems are subject to replay attacks, particularly key replay attacks, in which unencrypted decryption information is intercepted and recorded as it is being passed to a TDM. Subsequently, the recorded decryption information may then be used at a later time to gain unauthorized access to the encrypted transport streams. For example, User A and User B both record a transport stream containing a particular audio/video stream, such as a movie. User A purchases the service; therefore the CAM in A's receiver will provide keys to use in decrypting the transport stream. User A can record the keys provided by the CAM as they are being passed to the TDM, and send them to User B. Thus, User B is able to decrypt the stream using the keys provided by A, viewing or using the stream without purchasing it.

A. Wasilewski, H. Pinder, G. Akins, M. Palgon, Conditional access system, U.S. Pat. No. 6,157,719 (Dec. 5, 2000) and R. Banker, G. Akins, Preventing replay attacks on digital information distributed by network service providers, U.S. Pat. No. 6,005,938 (Dec. 21, 1999) provide techniques for preventing replay attacks on digital information distributed by network services. At the beginning of a subscription period for a service, a network service provider sends entitlement messages to the subscriber that provide the subscriber with a session key and authorization information, specifying a service and a period of time. When an encrypted service instance is distributed, it is accompanied by entitled control messages. The subscriber equipment that decrypts the service instance does so only if the time specifier in the entitlement control message specifies a time period specified by the authorization information. While the disclosed technique certainly complicates replay attacks by introducing a time element absent in conventional methods, it does not prevent them. In particular, it does not prevent recording and replaying of generated control words or instance keys.

S. Ooi, Decryptor, U.S. Pat. No. 5,790,666 (Aug. 4, 1998) describes a decryptor within a receiver unit of a conditional access system that includes a descrambler for descrambling signals scrambled at the headend using a pseudo-random noise generator. At the receiver, a pseudo-random noise generator is induced to change its state, through the provision of a scramble key, so that it generates pseudo-random noise signals that descramble the scrambled signal. The encrypted scramble key is transmitted from the headend and decrypted at the receiver after a cascade of conditions is satisfied. The decryptor, as described, provides a robust, multi-layer security apparatus for a conditional access system. Nevertheless, it suffers a vulnerability to replay attacks common to many conditional access systems. The scramble key, when it has been decrypted, may be intercepted and recorded as it is passed to the descrambler. Subsequently, the recorded key may be replayed, either on the same receiver, or different receivers, creating the possibility of pirating and unauthorized use of the signal.

Accordingly, there exists a need for a way of preventing replay attacks in conditional access systems. It would be desirable to provide protection in multiple layers, so that if one layer is compromised, the other layers remain intact.

SUMMARY OF THE INVENTION

In a conditional access system, a headend transmits content to one or more receivers as encrypted transport streams. The system includes a multi-layer security architecture that renders the system highly resistant to key replay attacks at the receiver. Thus, if one layer is circumvented, the other layers remain intact. A first layer prevents unencrypted keys from being recorded by shielding the unencrypted keys from users and encrypting the path from the receiver's conditional access module (CAM) to the transport decryption module (TDM); a second layer prevents a key recorded on one receiver from being played back to the transport decryption module on a second receiver; and a third layer prevents a user from decrypting transport streams without the encryption module by encrypting the stream a second time prior to being passed through any user-accessible memory or processor.

The multi-layer security architecture is achieved by means of a series of cryptographic procedures between the headend and the various components of the receiver. First is a procedure for pairing the transport components with the CAM in which a random secret generated at the headend is encrypted and transmitted to the transport reception module (TRM), the TDM and the CAM. Each of the three components decrypts the secret and stores it for future use. Second is a transport stream recording procedure that requires a local key, specific to the receiver, generated by the CAM. Third is a procedure for decrypting and replaying the transport stream, also requiring the local key.

An event table for an MPEG stream is constructed in advance of the user purchasing rights to use the stream. In one embodiment, the event table is transmitted unencrypted, along with the corresponding stream, so that the receiver may access the table without decrypting the stream. In an alternative embodiment, the event table is encrypted to prevent unauthorized use.

BRIEF DESCRIPTION OF THE DRAWINGS

FIG. 1 provides a block diagram of a conditional access system that is resistant to replay attacks, according to the invention.

DETAILED DESCRIPTION

The invention provides a conditional access system that is resistant to playback attacks. The invention is also embodied as a cryptographic method for rendering a conditional access system resistant to replay attacks, particularly key replay attacks.

Referring now to FIG. 1, shown is a conditional access system that includes a headend 11 and a receiver 12. In actual fact, the system includes a plurality of substantially identical receivers, but the invention is described herein in terms of one receiver. The receiver includes a transport reception module (TRM) 15 for receiving a transport stream 14 from the headend, and saving it to storage component 17. As FIG. 1 shows, the transport stream 14 is encrypted by an encryptor 20 prior to transmission. Further, the receiver includes a transport decryption module (TDM) 16 that retrieves the transport stream from storage components 17 and decrypts it when access rights to the steam have been purchased by an end user. Additionally, the receiver includes a conditional access module (CAM) 18 that is operative to decide whether or not to decrypt the stream, based on the serves that the user has purchased. If the CAM allows the user to view or use the transport stream, it decrypts the key required to decrypt the transport stream and provides them to the TDM. The conditional access system 10 incorporates a multi-layer security architecture that prevents key replay attacks at the receiver 12. The novel security architecture relies on conventional encryption technology, applied in a new and unique way. The multi-layer security architecture, based on public key encryption is implemented in a series of cryptographic procedures, described in greater detail below.

By providing multiple layers of security, if one security layer is circumvented, the other layers remain intact, thus providing a much higher degree of protection against replay attacks than is conventionally possible.

A first security layer is provided to prevent keys from being recorded from the CAM 18. This is accomplished by never exposing unencrypted keys to the end user or any user programmable processor within the system, or storing them within any user-accessible memory within the system. Furthermore, the communication path between the CAM and the TDM is encrypted.

If, for some reason, the first layer were to fail, and the user were to gain access to the keys, a second layer prevents the keys from being played back to a TDM on another receiver by ensuring that the TDM will not accept the key without it being transformed in a way that is unique to a particular receiver. Thus, a local key is required that is derived from the decryption key provided by the headend. In the current invention, the CAM provides the functionality required to generate local keys. It should be noted that the degree of security provided by this layer is in direct proportion to the degree of difficulty a cracker would encounter in transforming one receiver's key into a key required by a second receiver.

A third layer of security prevents a user from intercepting the transport stream and decrypting it without the TDM. This is accomplished by never exposing the transport stream to the user. Before passing the stream through any user-programmable processor or user-accessible memory, the transport stream must be encrypted a second time. The security of the doubly-encrypted stream is further enhanced by providing an encryption mechanism that produces an encrypted stream that is particular to the receiver, rendering it useless on another receiver.

Implementation

The multi-layer security architecture is implemented as a series of cryptographic procedures, described in detail in Tables 1-3, below.

As shown in FIG. 1,
The headend 11 has:
   a Global Secret Key: GSK;
   a Headend Private Key;
   receiver's Transport Public Key; and
   Receiver's CAM Public Key.
The TRM 15 has:
   Transport Private Key; and
   Headend Public Key.
Likewise, the TDM 16 also has:
   Transport Private Key; and
   Headend Public Key
The CAM 18 has:
   CAM Private Key;
   Headend Public Key;
   Global Secret Key; and
   CAM Secret Key.

TABLE 1

CAM to TRM/TDM Pairing Procedure

1. Headend generates random secret: S
2. Headend cryptographically signs S using Headend Public Key: HPK(S).
3. Headend encrypts S, HPK(S) using Transport Public Key: TPK(S, HPK(S)).
4. Headend encrypts S, HPK(S) using CAM Public Key: CPK(S, HPK(S)).
5. Headend transmits (TPK(S, HPK(S)) and CPK(S, HPK(S)) to TRM.
6. TRM decrypts TPK(S, HPK(S)) using Transport Private Key; S, HPK(S).
7. TRM verifies signature of HPK(S) using Headend Public Key. If signature is invalid, processing stops here.

TABLE 1-continued

CAM to TRM/TDM Pairing Procedure

8. TRM stores shared secret, S, for later use.
9. TRM passes TPK(S, HPK(S)) to TDM.
10. TDM decrypts TPK(S, HPK(S)) using Transport Private Key: S, HPK(S).
11. TDM verifies signature of HPK(S) using Headend Public Key. If signature is invalid, processing stops here.
12. TDM store shared secret, S, for future use.
13. TRM passes CPK(S, HPK(S)) to CAM.
14. CAM decrypts CPK(S, HPK(S)) using CAM Private Key: S, HPK(S).
15. CAM verifies signature of HPK(S) using Headend Public Key. If signature is invalid, processing stops here.
16. CAM stores shared secret, S, for future use.

Thus, as described in Table 1, above, a random secret is generated by the headend. As FIG. 1 shows, the random secret is generated at the headend 11 by a pseudo-random number generator 19. However, other equally suitable methods of generating the secret will be apparent to those skilled in the art. The general direction of the encrypted signal is shown by arrow 13. Thus, encrypted decryption keys, encrypted, signed secrets, and the encrypted transport stream itself traverse this same path from the headend to the receiver. The encrypted keys and secrets may be provided at the same time as the transport stream, either embedded in the stream, or as a separate stream, or they may be provided separately from the transport stream. Upon being received from the headend, the TRM, the TDM and the CAM all receive the encrypted secret. They decrypt the secret, verify the signature and store the secret for future use. As described below, the shared secret is necessary for the generation and utilization of the local key, which is required for recording and decrypting the transport stream.

TABLE 2

Transport Stream Recording Procedure

1. Headend generates an encryption Key: K.
2. Headend encrypts key using Global Secret Key: GSK(K).
3. Headend transmits GSK(K) to TRM.
4. Headend encrypts transport stream using K: K(TS).
5. TRM sends GSK(K) to CAM.
6. CAM generates Local Key by encrypting GSK(K) using CAM Secret Key: LK = CSK(GSK(K)).
7. CAM encrypts LK using shared secret, S: S(LK).
8. CAM sends S(LK) to TRM.
9. TRM decrypts S(LK) using shared secret, S: LK.
10. Headend transmits K(TS) to TRM.
11. TRM further encrypts K(TS) using LK: LK(K(TS)).
12. TRM stores GSK(K) and LK(K(TS)) on a storage medium.

As Table 2 describes, the encrypted decryption key is transmitted from the headend. The CAM transforms the decryption key using the CAM secret key, and the shared secret, S, both unique to that particular receiver, rendering the decryption key useless on any other receiver. The local secret is transmitted to the TRM from the CAM. Prior to being stored, in storage component 17, the encrypted transport stream is encrypted a second time, using the local key, effectively rendering the transport stream inaccessible. It should be mentioned that the storage component may consist of a memory or a mass storage device. The mass storage device may be a fixed drive such as a disk drive, or it may be a removable storage medium, such as a DVD.

TABLE 3

Transport Stream Playback Procedure

1. TDM retrieves GSK(K) and LK(K(TS)) from storage medium.
2. TDM sends GSK(K) to CAM
3. CAM generates Local Key by encrypting GSK(K) using CAM Secret Key: LK = CSK(GSK(K)).
4. CAM decrypts GSK(K) using GSK: K.
5. CAM encrypts K, LK using shared secret, S: S(K, LK).
6. CAM sends S(K, LK) to Transport.
7. TDM decrypts S(K, LK) using shared secret, S: K, LK.
8. TDM decrypts LK(K(TS)) using LK: K(TS).
9. TDM decrypts K(TS) using K: TS.
10. TDM sends Transport Stream, TS, to display module As Table 3 describes, the TDM retrieves the doubly encrypted transport stream from the storage component 17, along with the decryption key. The decryption key is transmitted to the CAM, whereupon it is transformed into a local key, using shared secret, S and the CAM secret key. Prior to display, the transport stream must be decrypted twice. The first time using the local key, and the second time using the decryption key provided by the headend. Thus, in the form it is retrieved from the storage component, the transport stream is useless, except on that particular receiver.

The invention is applicable in any type of subscription-based or conditional access network environment, in which a network service provider distributes digital information to users of the network. Typically, the network will be a publicly-accessible telecommunications network such as a cable television network or the Internet. Furthermore, the network connection may be wired or wireless. Depending on the network and the nature of the content provided, the receiver may constitute a set-top box or a personal computer. The nature of the content is highly-variable; the invention is equally applicable to television programming, movies, pay-per-view sports events, digital music, digitized images, information products in digital format or software. Other network environments, hardware platforms and areas of application consistent with the spirit and scope of the invention will be apparent to those skilled in the art.

MPEG is an industry standard for compressing, multiplexing, and transmitting digital video and audio. An MPEG stream is composed of a sequence of data bytes. These bytes can be logically grouped together to form a single element within an MPEG stream. For example, a single element within an MPEG stream might represent a single frame of video within a movie.

The MPEG standard defines byte sequences that indicate the start of an element within an MPEG stream; such byte sequences are commonly referred to as "start codes." Some common examples of MPEG start codes are:

Video Packetized Elementary Stream Header;
Video Group of Pictures Header;
Video I Frame Header;
Video P Frame Header;
Video B Frame Header;
Video Slice Header; and
Audio Packetized Elementary Stream Header.

It is often useful or necessary to build an Event Table that indicates the location of start codes within an MPEG stream. This table is composed of a list of offsets into the MPEG stream. The offsets listed in the table correspond to location in the MPEG stream that contain start codes.

The Event table may contain additional information, as well. For example, it is often useful to describe what type of start code is located at each offset. Using the Event Table allows a playback device to quickly locate a particular element within an MPEG stream. For example, one method of quickly scanning through video (fast forward) is to play only a subset of the video frames contained within the stream. The Event Table can be used to quickly locate those frames that need to be displayed.

One application where it is useful to build such a table is on a device designed to receive, store and play back MPEG stream transmissions. Since MPEG streams are often encrypted before transmission to prevent unauthorized use, it is desirable to store the MPEG stream at the receiver in its encrypted from prior to purchase, in order to prevent unauthorized use. Typically, the stream is not decrypted until the rights to use or view the stream are purchased. Conventionally, the event table cannot be built until the MPEG stream is decrypted. Building the event table can be a time consuming process. Accordingly, this can impose a significant time delay between the time that the rights to use the stream are purchased and the time that the Event Table is created and available for use.

In order to make the Event Table available immediately, an embodiment of the invention is provided in which the Event Table is created prior to transmission of the stream. A first alternative is to transmit the Event Table along with the associated MPEG stream, so that the receiver has access to the Event Table without decrypting the MPEG stream. A second alternative is to encrypt the Event Table itself prior to transmission, to protect it from unauthorized use.

Although the invention has been described herein with reference to certain preferred embodiments, one skilled in the art will readily appreciate that other applications may be substituted without departing from the spirit and scope of the present invention. Accordingly, the invention should only be limited by the Claims included below.

What is claimed is:

1. A method, comprising:
    creating, at a headend, an event table for a corresponding transport stream, the event table comprising a location of one or more start codes within the transport stream;
    transmitting the transport stream from the headend to at least one receiver among a plurality of receivers;
    transmitting the event table from the headend to the at least one receiver among a plurality of receivers.

2. The method of claim 1, wherein the event table further comprises a type of at least one start code of the one or more start codes.

3. The method of claim 1, further comprising:
    encrypting the event table prior to transmission with the transport stream.

4. The method of claim 1, wherein the transport stream is an encrypted transport stream, and further comprising:
    storing the encrypted transport stream transmitted at the at least one receiver; and
    encrypting, at the at least one receiver, the transport stream to obtain a doubly encrypted transport stream;
    storing the doubly encrypted transport stream on a storage medium accessible to the at least one receiver.

5. The method of claim 1, wherein at least one start code of the one or more start codes indicates a start of an element in an MPEG stream.

6. The method of claim 1, wherein the transport stream is an encrypted transport stream.

7. A system comprising:
    a subsystem, at a headend, implemented at least partially in hardware, that creates an event table for a corresponding transport stream, the event table comprising a location of one or more start codes within the transport stream;
    a subsystem, implemented at least partially in hardware, that transmits the transport stream from the headend to at least one receiver among a plurality of receivers;
    a subsystem, implemented at least partially in hardware, that transmits the event table from the headend to the at least one receiver among a plurality of receivers.

8. The system of claim 7, wherein the event table further comprises a type of at least one start code of the one or more start codes.

9. The system of claim 7, further comprising:
    a subsystem, implemented at least partially in hardware, that encrypts the event table prior to transmission with the transport stream.

10. The system of claim 7, wherein the transport stream is an encrypted transport stream, and further comprising:
    a subsystem, implemented at least partially in hardware, that stores the encrypted transport stream transmitted at the at least one receiver; and
    a subsystem, implemented at least partially in hardware, that encrypts, at the at least one receiver, the transport stream to obtain a doubly encrypted transport stream;
    a subsystem, implemented at least partially in hardware, that stores the doubly encrypted transport stream on a storage medium accessible to the at least one receiver.

11. The system of claim 7, wherein at least one start code of the one or more start codes indicates a start of an element in an MPEG stream.

12. The system of claim 7, wherein the transport stream is an encrypted transport stream.

13. A non-transitory computer readable medium storing instructions which, when executed by one or more processors cause performance of steps comprising:
    creating, at a headend, an event table for a corresponding transport stream, the event table comprising a location of one or more start codes within the transport stream;
    transmitting the transport stream from the headend to at least one receiver among a plurality of receivers;
    transmitting the event table from the headend to the at least one receiver among a plurality of receivers.

14. The computer readable medium of claim 13, wherein the event table further comprises a type of at least one start code of the one or more start codes.

15. The computer readable medium of claim 13, further comprising:
    encrypting the event table prior to transmission with the transport stream.

16. The computer readable medium of claim 13, wherein the transport stream is an encrypted transport stream, and further comprising:
    storing the encrypted transport stream transmitted at the at least one receiver; and
    encrypting, at the at least one receiver, the transport stream to obtain a doubly encrypted transport stream;
    storing the doubly encrypted transport stream on a storage medium accessible to the at least one receiver.

17. The computer readable medium of claim 13, wherein at least one start code of the one or more start codes indicates a start of an element in an MPEG stream.

18. The computer readable medium of claim 13, wherein the transport stream is an encrypted transport stream.

* * * * *